United States Patent [19]

Yanagi et al.

[11] Patent Number: 5,394,397
[45] Date of Patent: Feb. 28, 1995

[54] SHARED BUFFER MEMORY TYPE ATM COMMUNICATION SYSTEM AND METHOD WITH A BROADCAST FACILITY

[75] Inventors: Junichirou Yanagi, Kodaira; Yoshihiro Ashi, Yokohama; Takahiko Kozaki, Koganei; Akihiko Takase, Tokyo; Takashi Nakashima, Yokosuka, all of Japan

[73] Assignees: Hitachi, Ltd.; Nippon Telegraph and Telephone, both of Tokyo, Japan

[21] Appl. No.: 38,615

[22] Filed: Mar. 29, 1993

[30] Foreign Application Priority Data

Mar. 27, 1992 [JP]  Japan .................................. 4-070594

[51] Int. Cl.⁶ ..................... H04L 12/56; H04L 12/48; H04J 3/26
[52] U.S. Cl. .................................. 370/60.1; 370/94.2
[58] Field of Search ........................ 370/60, 60.1, 94.1, 370/94.2, 58.1, 58.2, 58.3, 110.1

[56] References Cited

U.S. PATENT DOCUMENTS

| | | | |
|---|---|---|---|
| 5,138,613 | 8/1992 | Kudoh | 370/60 |
| 5,144,619 | 9/1992 | Munter | 370/60.1 |
| 5,287,530 | 2/1994 | Davis et al. | 370/60 |

*Primary Examiner*—Wellington Chin
*Attorney, Agent, or Firm*—Antonelli, Terry, Stout & Kraus

[57] ABSTRACT

An ATM switching system which includes an input interface which is provided every incoming line and serves to convert header information of each input cell into internal routing information, a shared buffer memory and a cell writing control unit which forms normal cell list structures, which are prepared in correspondence to outgoing lines and in which a plurality of normal cells are chained together with their next addresses, and a broadcast cell list structure, in which a plurality of broadcast cells are chained together with their next addresses, in the shared buffer memory, and serves to add successively the input cells to ones of the list structures, which are selected in correspondence to respective internal routing information. The invention also includes a cell reading control unit which serves to fetch selectively the cell from the list structures formed in the shared buffer memory to distribute the cell thus fetched to the associated outgoing lines. The cell reading control unit includes a broadcast destination table for "storing broadcast destination specifying information for specifying the outgoing lines, through which the broadcast cell is to be output, using a bit pattern, in correspondence to the internal routing information of the broadcast cell".

13 Claims, 12 Drawing Sheets

SHARED BUFFER MEMORY TYPE ATM COMMUNICATION SYSTEM AND METHOD WITH A BROADCAST FACILITY

CROSS-REFERENCE TO RELATED APPLICATION

This application relates to the subject matters of the following U.S. Applications:
(1) U.S. Pat. No. 4,910,731 to Sakurai et al. entitled "SWITCHING SYSTEM AND METHOD OF CONSTRUCTION THEREFOR".
(2) U.S. Pat. No. 5,129,977 to Kosaki et al. entitled "SWITCHING SYSTEM".
(3) U.S. Ser. No. 07/526381 entitled "SWITCHING SYSTEM" filed on May 21, 1990 in the name of Kosaki et al.
(4) U.S. Pat. No. 5,099,975 to Kosaki et al. entitled "SWITCHING SYSTEM".
(5) U.S. Pat. No. 4,947,388 to Kuwahara et al. entitled "CELL SWITCHING SYSTEM OF ASYNCHRONOUS TRANSFER MODE".

BACKGROUND OF THE INVENTION

The present invention relates to a shared buffer memory type ATM communication system and method with a broadcast facility. More particularly the present invention relates to a communication system and method, such as an ATM switching system, ATM cross-connect equipment or subscriber's line demultiplex equipment, that form a communication network operating in the ATM (asynchronous transfer mode being) used for BISDN (broadband integrated service digital network) having a broadcast facility for sending information to a plurality of destinations.

In an ATM communication network used for BISDN, the information is transmitted in fixed length data blocks (data packets) called cells. The routing information is added to a head part of each cell, and in each transmission system/switching system, the transmission/exchange of the cell is performed in accordance with the routing information.

In BISDN, for example, for the distribution of video information, a video conference among multiple positions, and the like, a service for distributing the same information to a plurality of locations is provided. In such application, it is necessary to send the same cell to a plurality of destination systems. Therefore, in the switching system for example, "a broadcast processing" or "a broadcast facility" becomes essential which is used to produce a plurality of copy cells from one cell received from the calling system and to send the resultant copy cells to a plurality of destination systems in accordance with the routing information.

One example of a method of realizing a broadcast facility in an ATM switch is, for example, described in "Output Buffer Switch for Asynchronous Transfer Mode" by Hiroshi Suzuki et al., IEICE Technical Report, SSE88-172 (1988).

The ATM switch proposed in the above-mentioned article is designed in such a way that it is made up of a plurality of unit switches connected in multiple stages, and BCN (broadcast channel number) is added to an input cell which is to be subjected to the broadcast processing (hereinafter, referred to as "a broadcast cell", when applicable) by input interfaces which are connected to the subscriber's lines of the ATM switch and serve to supply the routing information to the broadcast cell.

Each unit switch includes a plurality of input ports, a plurality of output ports, and a plurality of output buffers provided in correspondence to the output ports, and operates in such a way that the input cells input from the input ports are routed to the associated output buffers, which are located in positions specified by the routing information which the individual cells have, and the cells stored in the output buffers are read out in sequence to the output ports. According to the above-mentioned prior art, in order to process the broadcast cell, each unit switch includes a broadcast control table for storing a bit pattern used to specify the output ports from which the broadcast cell is to be output, in correspondence to BCN of the broadcast cell. Thus, when the broadcast cell is input from one input port, a bit pattern for specifying the output ports is read out from that broadcast control table with BCN added to that broadcast cell as an address, and the copies of that broadcast cell are input to a plurality of output buffers specified by that bit pattern. The destinations of the broadcast cell are controlled by changing the contents of the broadcast control table.

The above-mentioned prior art ATM switch employs the structure which is called "an outgoing buffer system". However, in the ATM switch having such a type, the buffer having a fixed capacity is prepared every outgoing line. Therefore, in order to reduce the possibility of abandonment of the cell in the case where the cell to be output to the specific outgoing lines is input in a burst manner, it is necessary to make the memory capacity of each buffer large. As a result, there arises a problem that the system scale is increased.

If as in the prior art described above, the ATM switch of "the outgoing buffer system", employs the broadcast processing system for storing the copies of the broadcast cell in the output buffers corresponding to the destinations, a part of the precious storage capacity of each output buffer, becomes occupied. Since the capacity of the buffer memory is limited there is a fear that the capacity is insufficient even in the inputting of normal cells when taken alone without the occurrence of the burst. Therefore, there arises a problem that the capacity of the buffer is further increased.

On the other hand, an ATM switch is disclosed in U.S. Pat. No. 4,947,388 by H. Kuwahara et al. The ATM switch is designed in such a way that in order to effectively utilize the capacity of the buffer memory. The buffer memory is previously divided into a first area for storing the normal cell and a second area for storing the broadcast cell. The broadcast cell is temporarily stored in the second buffer area irrespective of the destinations, and the broadcast cell is read out from the second buffer area to a broadcast control circuit which duplicates the broadcast cell by the necessary number corresponding to the destinations to distribute the resultant copies to the associated outgoing lines.

As for the structure of the ATM switch itself, in addition thereto, there have been proposed other ATM switches having various kinds of types. For example, the structure called "the shared buffer type memory switch" which is shown in "A Memory Switch Architecture for ATM Switching Network" by Noboru Endoh et al, IEICE Technical Report, SSE88-56 (1988), has a type in which the buffer for storing temporarily the cell is shared among a plurality of outgoing lines. Thus, this structure has such an advantage that even if the so-called "burst" occurs in which a large number of cells to be output arrive at the specific outgoing lines in bulk, it is possible to reduce the possibility of the loss of the cells which is due to the insufficiency of the buffer capacity for each of those specific outgoing lines.

"The shared buffer memory type ATM switch is, in addition thereto, described in U.S. Pat. No. 4,910,731 by Y. Sakurai et al. for example.

SUMMARY OF THE INVENTION

It is therefore an object of the present invention to provide an improved communication system and method for an ATM cell which is capable of utilizing effectively the limited capacity of the buffer memory to realize the broadcast facility.

It is another object of the present invention to provide a communication system and method for an ATM cell in which both the normal cell and the broadcast cell have the structure resistive to the occurrence of the burst.

In order to attain the above-mentioned objects, the communication system according to the present invention has a facility in which an input interface provided every incoming line converts the header information of each input cell into the internal routing information able to determine uniquely a route in the inside of the communication system, and also adds the information used to judge whether that input cell is a broadcast cell or a normal cell to the internal routing information.

Each input cell is stored temporarily in a shared buffer memory by cell writing control means. The cell writing control means forms a plurality of normal cell list structures which are prepared in correspondence to the outgoing lines and in which a plurality of normal cells are chained together with their next addresses, and a broadcast cell list structure in which a plurality of broadcast cells are chained together with their next addresses in the shared buffer memory. Then, the input cells are added in sequence to ones of those list structures which are selected in accordance with their internal routing information.

The normal cell list structures, which are formed in the above-mentioned shared buffer memory, are accessed cyclically by cell reading control means, and the normal cells, which have been fetched in sequence from the head parts of the normal list structures, are output to the outgoing lines corresponding to the list structures of interest.

In the present invention, the above-mentioned cell reading control means includes broadcast destination table means for "storing broadcast destination specifying information for specifying a plurality of outgoing lines, through which the copies of the broadcast cell are to be output using a bit pattern, in correspondence to the internal routing information of the broadcast cell", and broadcast control means for reading out the broadcast cell from the above-mentioned broadcast cell list structure by referring to the broadcast destination table means, and performing the control in such a way as to suppress the reading of the normal cell with respect to the outgoing lines through which the copies of the broadcast cell are to be output.

The above-mentioned broadcast control means checks, prior to the access to the normal cell list structures, whether or not the broadcast cell is registered in the broadcast cell list structure. Then, if so, the broadcast control means reads out the broadcast destination specifying information corresponding to the internal routing information, which the broadcast cell located at the head part of the broadcast cell list structure has, from the broadcast destination table means.

The above-mentioned broadcast control means accesses to both the normal cell list structure and the broadcast cell list structure on the basis of the broadcast destination specifying information, thereby to output the same broadcast cell, which is located at the head part of the broadcast cell list structure, to the associated outgoing lines specified as the broadcast destinations, and to output the normal cells, which are located at the head parts of the normal cell structures corresponding to the outgoing lines not specified as-the broadcast destinations, to the outgoing lines not specified as the broadcast destinations.

In each normal cell list structure, the reading addresses are managed in such a way that "at a time point when one normal cell located at its head part is read out, an address of the normal cell thus read out is stored in an idle address buffer to locate a next normal cell at the head part of the list structure." On the other hand, in the broadcast cell list structure, the reading addresses are managed in such a way that "by reading out repeatedly one broadcast cell located at its head part, the same broadcast cell is output to a plurality of outgoing lines specified as the broadcast destinations, and in predetermined timing after the completion of the output of the broadcast cell or the normal cell to the last outgoing line out of a plurality of outgoing lines, an address of that broadcast cell is stored in the idle address buffer to locate a next broadcast cell at the head part of the list structure."

The above-mentioned cell control means performs the writing of the input cells to the shared buffer memory using the addresses stored in the idle address buffer.

According to the communication system of the present invention, since the broadcast cells form the list structure in the same manner as that in the normal cells and are stored in the large-capacity shared buffer memory, the burst resistance which the shared buffer memory has essentially can be also utilized for the broadcast communication.

Moreover, since the copies of the broadcast cell are produced by reading out repeatedly one broadcast cell in the shared buffer memory to a plurality of outgoing lines, it is possible to reduce a traffic volume in the inside of the switch.

The foregoing and other objects, advantages, manner of operation and novel features of the present invention will be understood from the following detailed description when read in conjunction with the accompanying drawings.

DESCRIPTION OF THE PREFERRED EMBODIMENTS

In order to assist the comprehension of the present invention, prior to the explanation of the preferred embodiments of the present invention, the description will hereinafter be given with respect to the structure and the operation of the prior art "output buffer memory type ATM switch" with reference to FIGS. 1 and 2.

Figure 1:
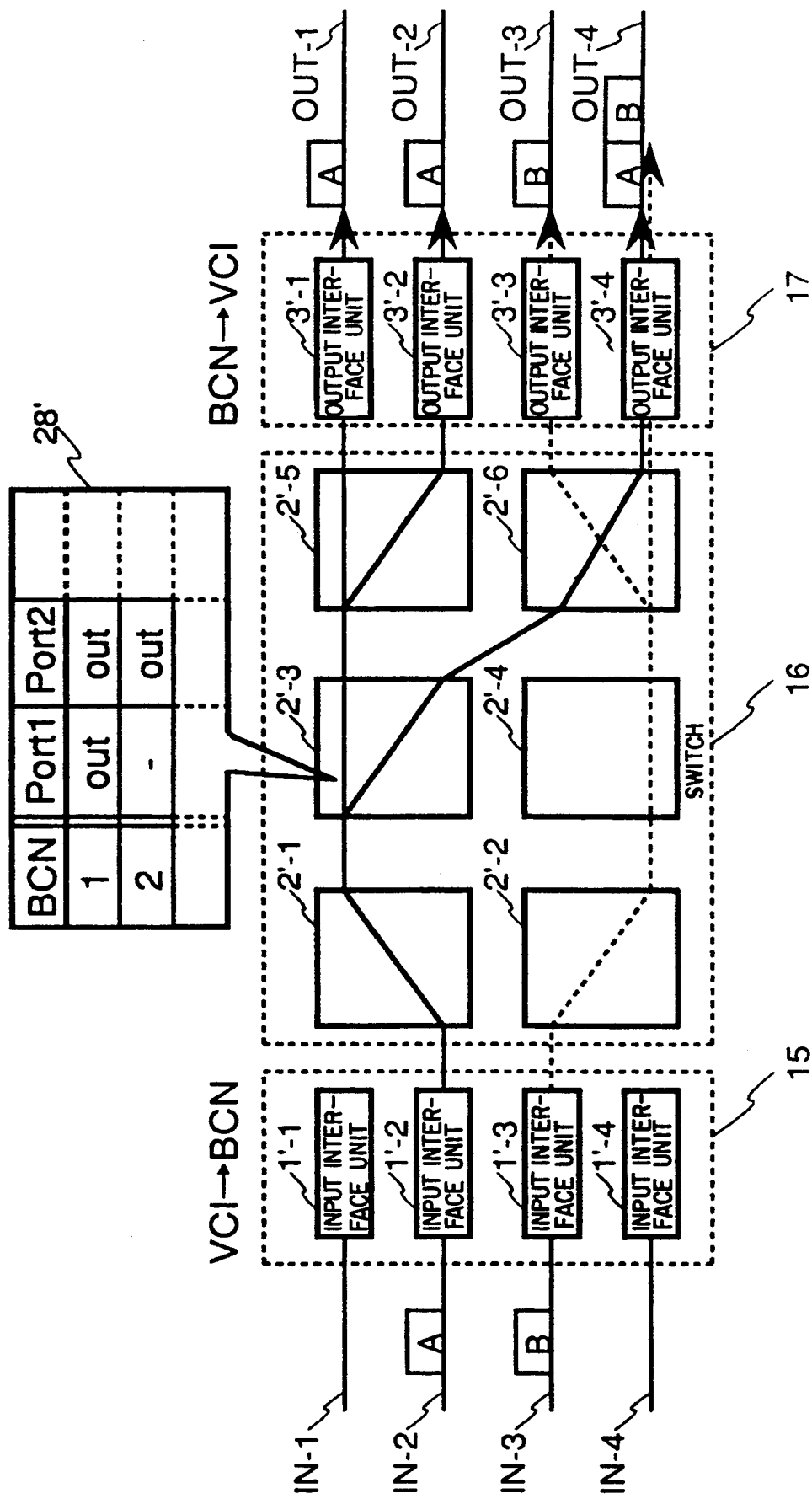
FIG. 1 is a block diagram useful in explaining the principle of an output buffer type ATM switch having a broadcast facility by the prior art.

FIG. 1 is a block diagram showing the situation of the duplicating operation and transfer with respect to a cell requiring the broadcast processing (hereinafter, referred to as "a broadcast cell" for short, when applicable) in the prior art switching system.

In the figure, the reference symbols IN-1 to IN-4 designate incoming lines, the reference numeral 15 designates an input interface unit which is made up of a plurality of input interfaces 1'-1 to 1'-4 which are provided in correspondence to the incoming lines and serve to perform the header conversion of the input cell, the reference numeral 16 designates a switch which is made up of a plurality of unit switches 2'-1 to 2'-6 connected in multiple stages, and the reference numeral 17 designates an output interface unit which is made up of a plurality of output interfaces 3'-1 to 3'-4 which are provided in correspondence to outgoing lines OUT-1 to OUT-4 and serves to perform the header conversion of the output cell.

When receiving the broadcast cell through the incoming line IN-i, each input interface 1'-i (i=1 to 4) gives BCN (broadcast channel number) corresponding to routing information, i.e., VCI (virtual channel identifier) of the input broadcast cell.

In this example, a situation is shown in which the broadcast cell CELL-A which is to be output from the outgoing lines OUT-1, OUT-2 and OUT-4 is input from the incoming line IN-2, and the broadcast cell CELL-B which is to be output from the outgoing lines OUT-3 and OUT-4 is input from the incoming line IN-3. Those broadcast cells are subjected to the routing control in accordance with BCN in each unit switch provided in the switch 16, and then are transferred to the associated outgoing lines through which those broadcast cells are to be output.

Each unit switch 2'-j (j=1 to 6) refers to a broadcast control table 28' on the basis of BCNs of the input broadcast cells. Then, when there are a plurality of output ports from which the broadcast cells are to be output, each unit switch 2'-j produces copies of the broadcast cell and then sends the broadcast cell (or its copies) to the associated output ports. In this example, in the broadcast control table 28, the port from which the broadcast cell is, to be output is represented by the symbol "OUT" every BCN.

Each output interface 3'-i (i=1 to 4) converts the header of the cell, which has been output from the switch 16, into the routing information which will be used in the subsequent unit. As a result, BCN of the broadcast cell is rewritten into the routing information.

Figure 2:
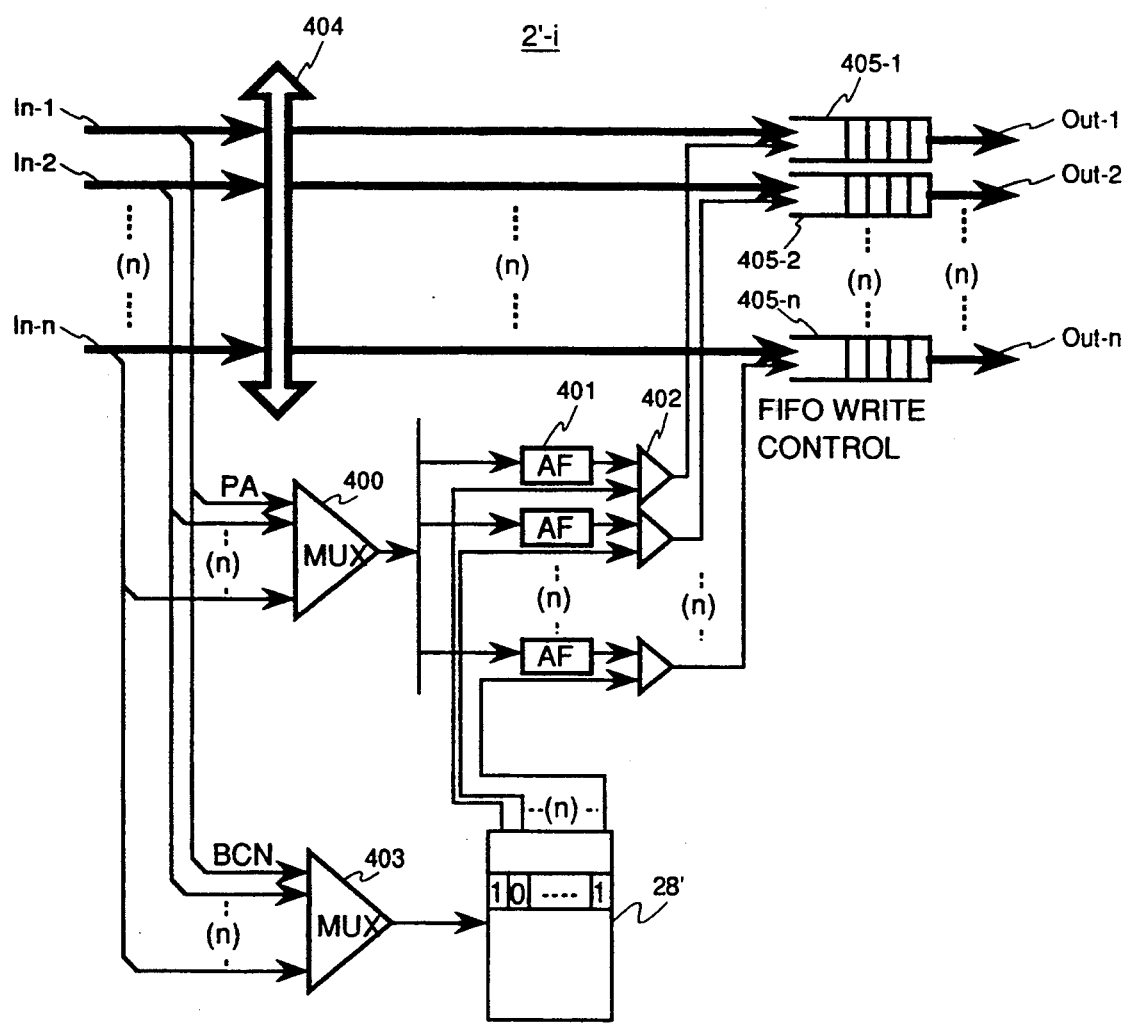
FIG. 2 is a diagram showing a basic structure of the ATM switch by the prior art.

FIG. 2 is a diagram showing the basic structure of the unit switch 2'-i which has the above-mentioned broadcast facility.

With respect to the cell which has been input from an input line In-i (i=1 to n), it is judged in an entry part of the unit switch whether that cell is "the broadcast cell" or "the normal cell" which does not require the broadcasting.

When the normal cell is input, PA (physical address) for making the routing information extracted from the cell header correspond to the physical output port number is multiplexed by MUX (multiplexer) 400. The multiplexed PA is then supplied to AFs (address filters) which are provided in correspondence to outgoing lines OUT-i (i=1 to n) and serve to judge whether or not the input cell should be output to the associated output lines. After the cell itself is multiplexed by a multiplexing bus 404, it is then supplied to output buffers 405-i (i=1 to n) which are provided in correspondence to the outgoing lines. For the control of the writing of the cell to the output buffers, the judgement results of AFs 401 are utilized, and to each output buffer is selectively written only the cell which is to be output to the outgoing line connected to that output buffer.

On the other hand, when the broadcast cell is input from the incoming line, BCN extracted from the cell header is multiplexed by MUX 403. Then, the multiplexed BCN is supplied as a reference key to the broadcast control table 28. A bit pattern corresponding to BCN is read out from the broadcast control table 28'. This bit pattern designates "1" for the outgoing line through which the broadcast cell is to be output, and designates "0" for the outgoing line through which no broadcast cell is to be output.

The description will hereinafter be given with respect to a shared buffer memory type ATM switch as a first embodiment of the present invention with reference to the accompanying drawings.

Figure 3:
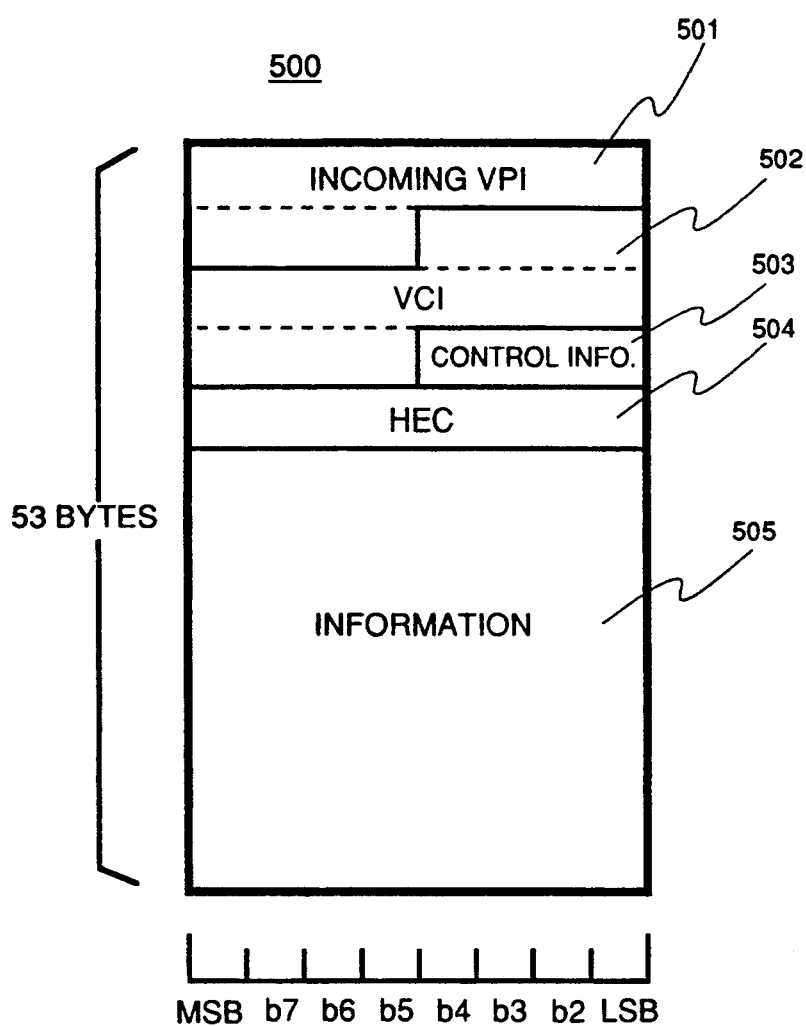
FIG. 3 is a diagram showing an example of a format of an input cell of an ATM switch.

FIG. 3 shows a format of a cell 500 which is to be input to the ATM switch. Although in this case, the cell having a 53 byte length as the international standard is typically shown, other lengths may be available as long as they are of the fixed length packet type.

The area of 5 bytes from the head part of the cell 500 is an area called "a cell header" or simply "a header" for setting the various kinds of control information. This area is made up of a field 501 for setting an incoming VPI (incoming virtual path identifier) as the information for routing the cell in the ATM switch, a field 502 for setting VCI (virtual channel identifier), a field 503 for setting the priorities relating to the abandonment of the cell, and the control information such as the kind of information included in an information field 505, and an HEC (header error control) field 504 for setting the error control symbol for the header. The user information (or the user data) which is the object of the transmission and the exchange is set in the information field 505.

Now, the reason for treating the routing information set in the field 501 as not the routing information simply, but "the incoming VPI" is that when in the entry of each switch, the routing information in this field is converted into VPI used for the self-routing in the switch, the routing information (VPI) before the conversion can be discriminated from the routing information (VPI) after the conversion. It is to be understood that as the self-routing information in the switch, instead of VPI, VCI (virtual channel identifier) may be used, or both VPI and VCI may be used.

Figure 4:
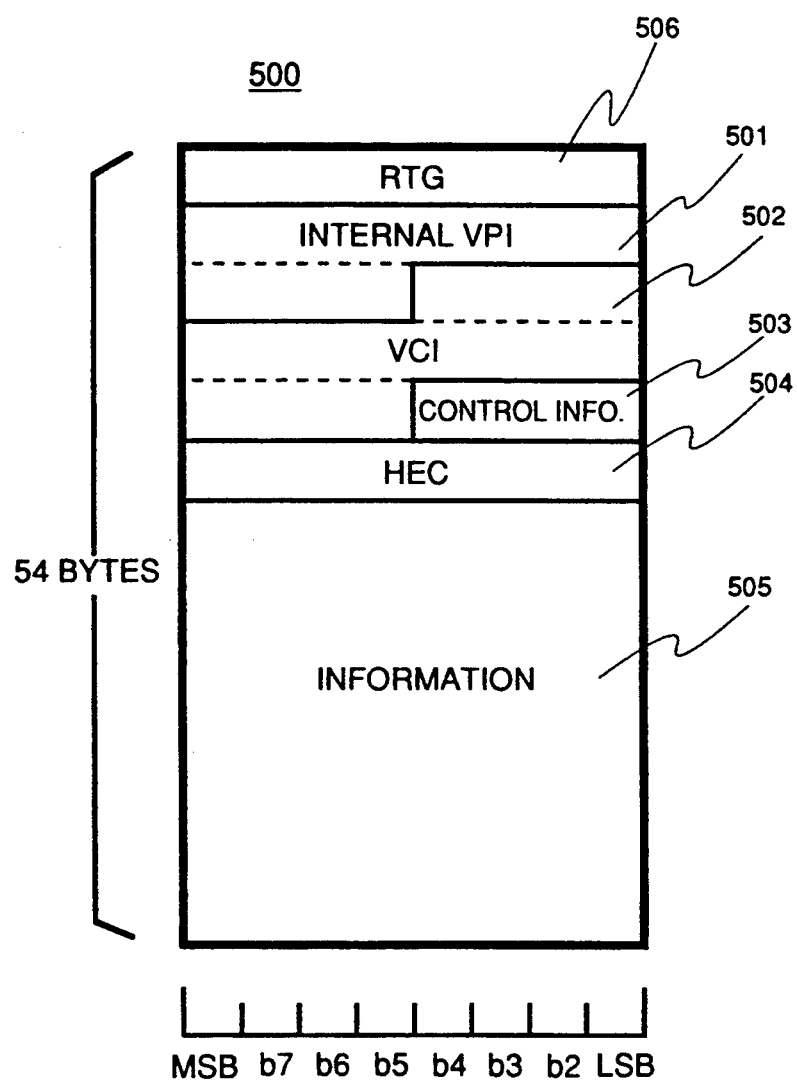
FIG. 4 is a diagram showing a format of a cell which is subjected to the header conversion by an input interface and is used in the inside of the ATM switch.

When switching the cell in the ATM switch, the cell format in the switch may be the same as the cell format shown in FIG. 4. In this case, the internal VPI which has been rewritten by the input interface is set in the incoming VPI field 501, the control of the production of the copy of the broadcast cell and the sending thereof is performed in accordance with the above-mentioned internal VPI, and the internal VPI is rewritten into the outgoing VPI by the output interface.

However, in order to simplify the treatment of the cell in the switch, the cell in the switch may have the format different from that shown in FIG. 3.

FIG. 4 is a diagram showing an example of the internal cell format in which the cell length in the switch is set to 54 bytes, and a field 506 of 1 byte length for setting RTG (routing tag) is added to the head part of the cell. The various uses of RTG can be considered. For example, RTG may be used as the tag for the routing in the system, or may be used as the identifier for representing the specific cell. In the example shown in FIG. 4, an internal VPI 507 is set as the routing information in the field 501, and other fields 502 to 505 are arranged in the same manner as that of FIG. 3.

If the identification information which represents whether the cell of interest is "the normal cell" or "the broadcast cell" is included in RTG 506 or the internal VPI 501, the broadcast cell detection for controlling the broadcast cell in the switch can be performed very simply. That is, the processing of judging whether or not the cell of interest is the broadcast cell needs to be performed with respect to all the input cells. Therefore, for the simplification of the structure of the system, the method in which that judgement can be made directly on the basis of the identification information extracted from each cell is better than the method in which it is, for example, realized by referring to the table on the basis of routing information VPI. Incidentally, the coding can be performed for the RTG field 506 using the routing information. However, in addition thereto, such a technique may be taken that the specific coding is previously defined with respect to the broadcast cell, and the information of that field is utilized as both the self-routing information and the broadcast cell identification information.

Figure 5:
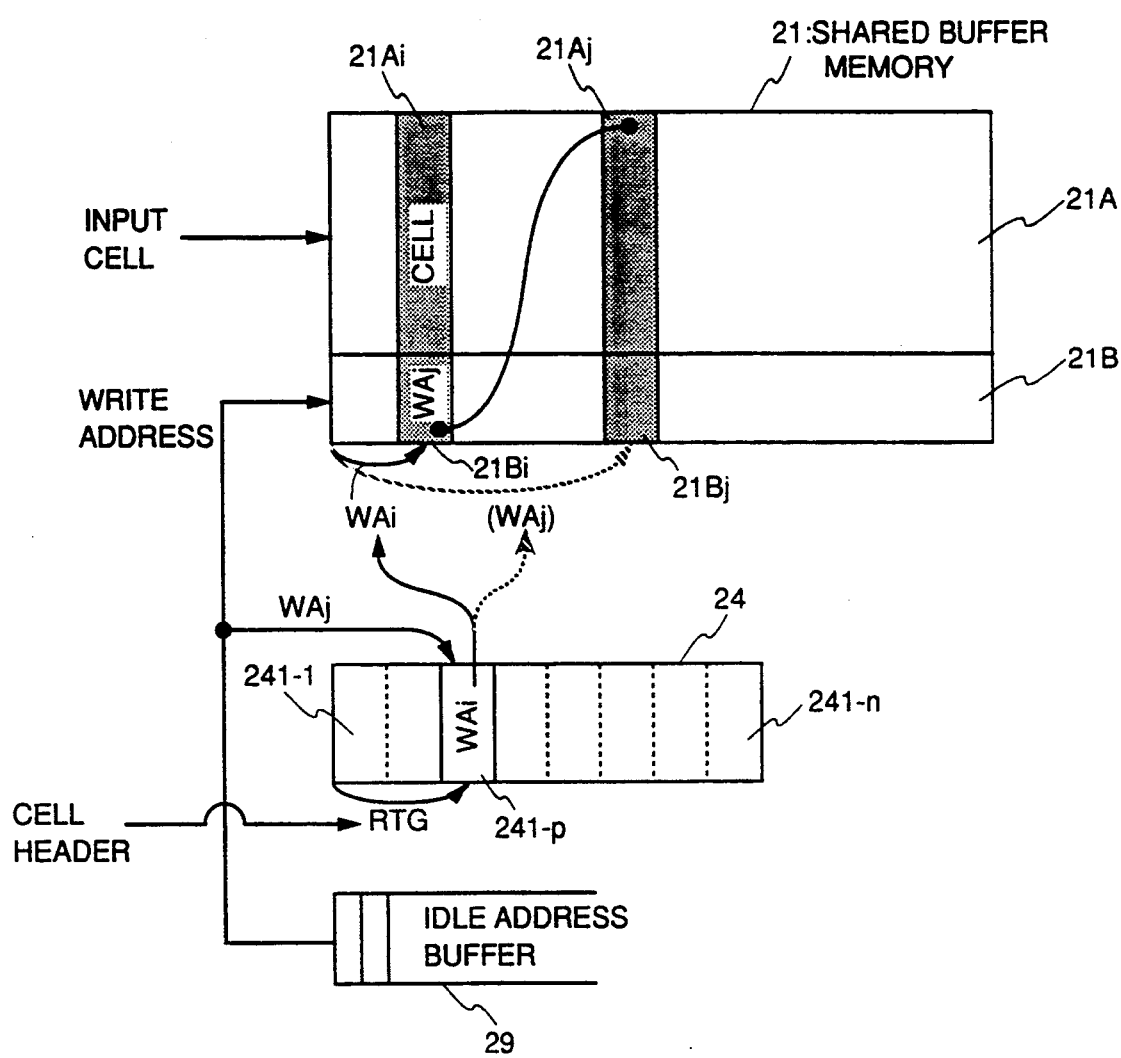
FIG. 5 is a diagram useful in explaining a list structure of the cell which is formed in a shared buffer memory of the ATM switch according to the present invention.

FIG. 5 is a diagram showing the list structure of the cell which is formed in the shared buffer memory used in the ATM switch of the present invention using the address chain, and the method of producing the same.

The shared buffer memory 21 is made up of an area (CELL PART) 21A for storing the cells, and an area (NEXT ADDRESS POINTER PART) 21B for storing addresses each designating a next cell belonging to the same list structure. In this connection, for example, as shown by the reference symbols 21Ai and 21Aj, one cell record is made up of a pair of one cell and one address pointer.

The reference numeral 24 designates a cell writing controller having a table memory made up of a plurality of memory locations 241-1 to 241-n which correspond to RTGs extracted from the fields 506 of the input cells, and the reference numeral 29 designates an address buffer memory for storing idle addresses. An address WA of the cell record corresponding to RTG is stored in each memory location of the above-mentioned table memory.

Now, when the cell arrives at the switch, the table memory of the above-mentioned cell writing controller 24 is accessed with RTG extracted from the field 506 of the header part of the input cell as an address, the address WAi which was stored at the last time is read out from a memory location 241-p corresponding to the value of RTG, the input cell is written to the cell area 21Ai of the shared buffer memory 21 with the address WAi as a writing address, and at the same time a writing address WAj which has been fetched from the idle address buffer 29 is written to an address pointer area 21Bi. At this time, in the table memory of the above-mentioned cell writing controller 24, instead of the address WAi which has been stored therein, a writing address WAj which has been fetched from the idle memory buffer 29 is newly stored therein.

Under this state, when a new cell having the same value as that of RTG arrives at the switch, this new cell is written to a buffer memory location 21Aj specified by the address WAj which has been read out from the memory location 241-p of the table memory, and a new writing address WAk which has been fetched from the idle address buffer 29 is written to the address pointer 21Bi. Then, the address WAj of the address table is replaced with WAk.

By repeating the above-mentioned operation, the address pointer WAj of the cell record 21Ai designates the memory location of the next cell record 21Aj belonging to the same RTG as that of the cell record 21Ai, and the address pointer WAk of the cell record 21Aj further designates the memory location of the next cell record. As a result, a plurality of cells belonging to the same RTG are linked with the address chain to form one list structure.

Therefore, in the operation of reading out the cell from the buffer memory, if when reading out one cell record 21Ai, the address pointer WAj is stored, on the basis of the address WAj, the next cell record 21Aj in the same list structure can be read out at the next cell reading opportunity.

Figure 6:
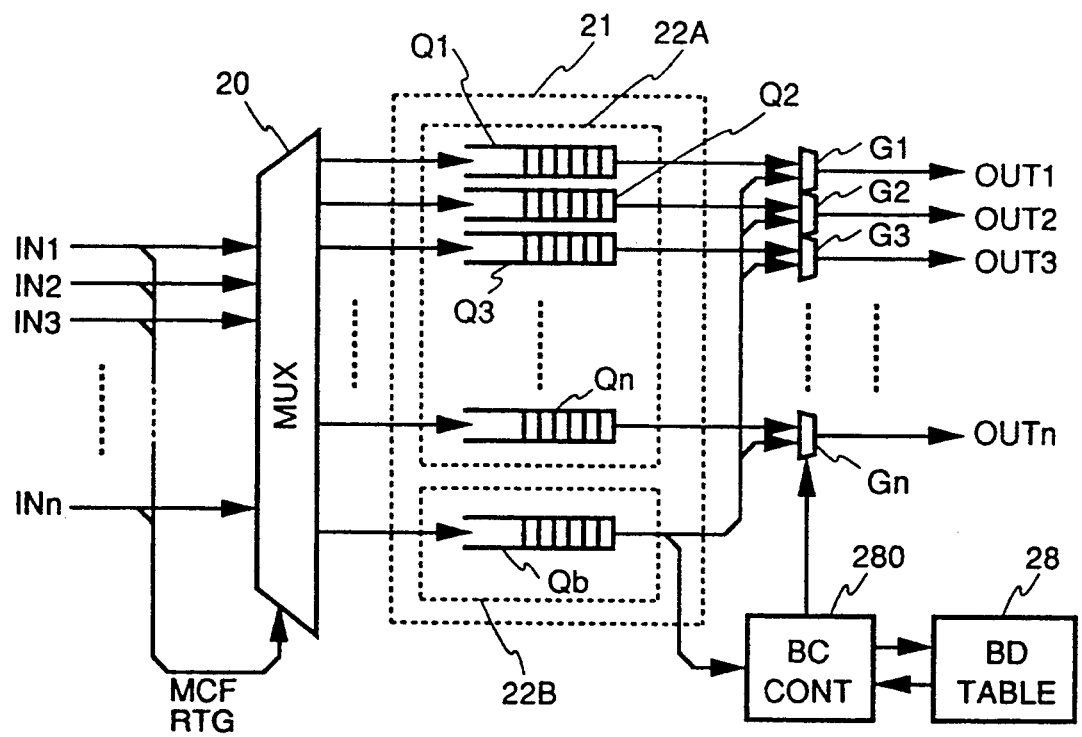
FIG. 6 is a block diagram useful in explaining the principle of operation of the ATM switch having a broadcast facility according to the present invention.

FIG. 6 is a block diagram showing schematically the main facility of the ATM switch as a first embodiment of the present invention.

In the figure, there is shown an example in which the identification bit, which is called MCF (multicast flag) for discriminating the broadcast cell from the normal cell is used in a part of RTG. Moreover, queues Q1 to Qn, and Qb shown in the shared buffer memory 21 represent schematically the list structures of the cells which were explained with reference to FIG. 5. The queues Q1 to Qn represent the list structures of the normal cells which are formed in correspondence to the outgoing lines OUT1 to OUTn, and the queue Qb represents the list structure of the broadcast cell.

In the first embodiment, prior to the access to the queues Q1 to Qn, the queue Qb is accessed, the broadcast cell which is located at the head part of the broadcast cell chain is read out, and the internal routing information (VPI) is fetched from the field 501 of that broadcast cell. Then, on the basis of the internal routing information thus fetched, the broadcast control unit 280 refers to the broadcast destination table (BD TABLE) 28, and determines the outgoing lines, through which the broadcast cell is to be output, from the broadcast destination specifying bit pattern, which is defined in the broadcast destination table in correspondence to VPI.

Next, in the cycle in which the normal cell queues Q1 to Qn are accessed in sequence, the broadcast control unit 280 reads out the cell from the normal cell queue Qi in timing of reading out the cell to the outgoing line OUTi through which the broadcast cell is not to be output, and reads out the above-mentioned broadcast cell located at the head part of the broadcast cell queue Qn again in timing of reading out the cell to the outgoing line OUTj through which the broadcast cell is to be output. Those normal cell and broadcast cell thus read out to the outgoing lines OUT1 to OUTn (actually, the output interfaces) through gates G1 to Gn.

In predetermined timing after the broadcast cell has been output to all the associated outgoing lines which are specified by the above-mentioned bit pattern of the broadcast destination table 28, and the normal cell or the broadcast cell has been output to the outgoing line OUTn, the head broadcast cell is removed from the cell chain in the broadcast cell queue Qb, a next broadcast cell in the queue Qb is read out, and on the basis of the broadcast destination bit pattern which is defined in correspondence to the internal routing information (VPI) of that cell, the next reading cycle of reading out the cells from the normal cell queues Q1 to Qn and the broadcast cell queue Qb to the outgoing lines OUT1 to OUTn is carried out.

In the case where no broadcast cell is present in the broadcast cell queue Qb, all the normal cell queues Q1 to Qn are cyclically accessed, and the normal cells are output in sequence to the outgoing lines OUT1 to OUTn.

In the above-mentioned embodiment, for the outgoing line OUTi which is specified as the destination of the broadcast cell by the broadcast destination specifying bit pattern, the broadcast cell is output priorly. However, in the case where the normal cell is present in the normal cell queue Qi corresponding to the outgoing line OUTi through which the broadcast cell is to be output, this normal cell may be output prior to the broadcast cell. For example, such procedure may be taken that the output ratio of the normal cell to the broadcast cell is determined every outgoing line, and the cell is read out in the ratio of one broadcast cell to the N normal cells. In this case, the address release of the broadcast cell is performed after it is confirmed that the copy cells have been output to all the outgoing lines to which the broadcasting is assigned.

Figure 7:
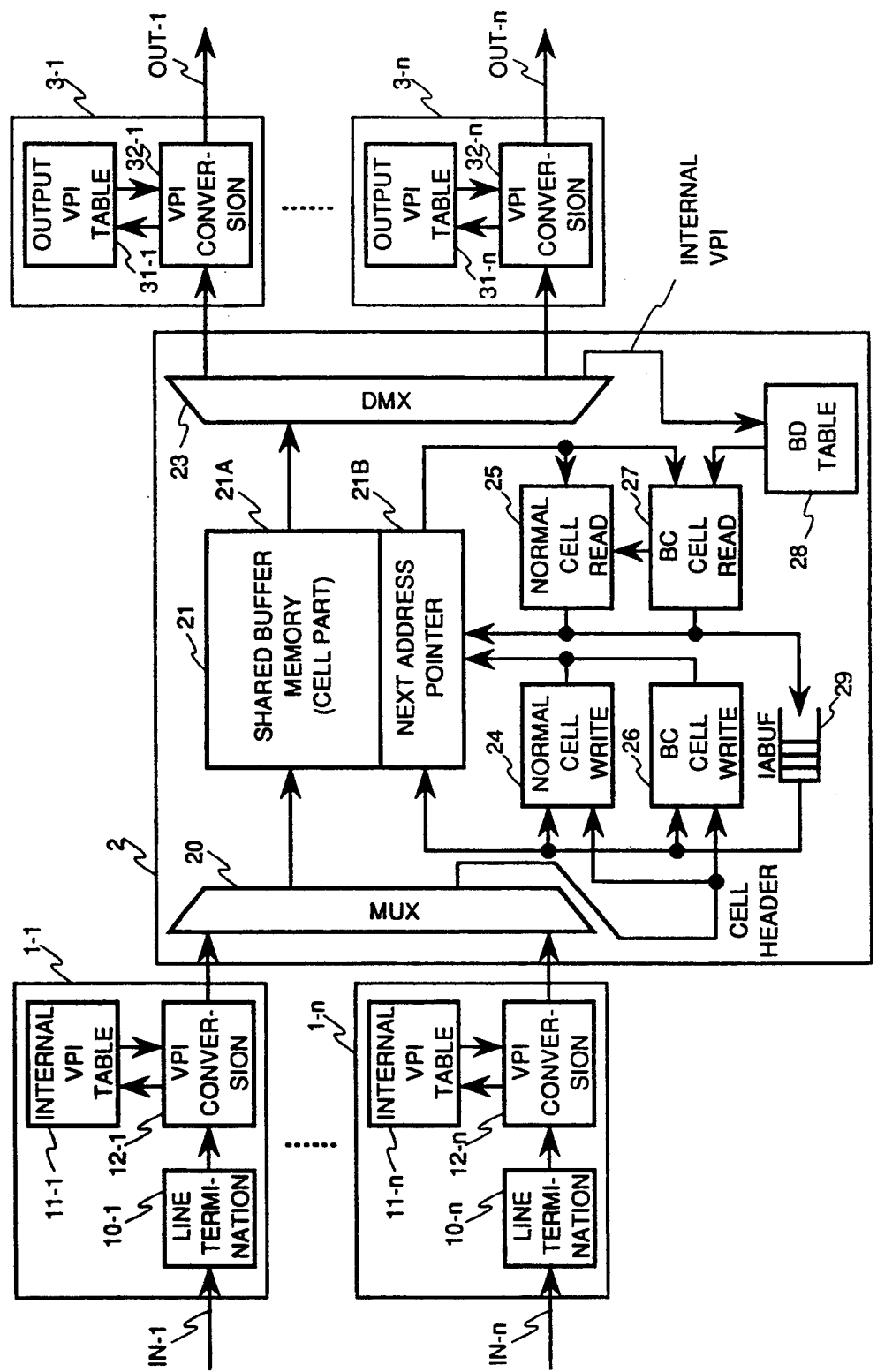
FIG. 7 is a block diagram showing a structure of an embodiment of a shared buffer memory type ATM switch according to the present invention.

FIG. 7 is a block diagram showing the basic structure of the ATM switch having a broadcast facility of the first embodiment of the present invention. In this case, "a VP switch" is shown in which ATM cells which have been input from the n incoming lines IN-1 to IN-n are subjected to the switching control on the basis of VRI (virtual path identifier) of each cell to be output to the n outgoing lines OUT-1 to OUT-n. However, the present invention is also applicable to ATM switching systems having other control types such as "a VC switch" for performing the switching control on the basis of VCI of the input cell.

The cell, which has arrived at the ATM switching system from each incoming line, is subjected to the preprocessing in an input interface 1 (1-1 to 1-n) provided every incoming line. That is, the information relating to the maintenance and the operation of the transmission line is terminated in a line terminating circuit 10 (10-1 to 10-n), and the ATM cell part shown in FIG. 3 is extracted.

The ATM cell which has been extracted by the line terminating circuit 10 is sent to an internal VPI conversion unit 12 (12-1 to 12-n) which extracts the routing information from the header of the input cell, and on the basis of the routing information thus extracted, an internal VPI table 11 (11-1 to 11-n) is referred.

The above-mentioned internal VPI table 11 stores the correspondence relationship between the information relating the routing included in the header part of the input cell, and the internal VPI as the routing information in the switch. The internal VPI which is to be given to the input cell is read out from that table, and an internal VPI conversion unit 12 rewrites VPI of the input cell which has arrived into the internal VPI. Identification information (RTG) for representing whether or not the cell of interest is the broadcast cell is added to each cell in such a way that in the inside of the switch, the broadcast cell can be readily distinguished from the normal cell.

In a switch 2, the cells from the input interfaces 1-1 to 1-n are multiplexed by MUX (multiplexer) 20 and then are supplied in a time series order to the shared buffer memory 21. At this time, when the input cell is the normal cell, the cell writing address to the shared buffer memory 21 is given by a normal cell writing control unit 24, and when the input cell is the broadcast cell, it is given by a broadcast cell writing control unit 26. By the writing address control which was described with reference to FIG. 3, the normal cell queues (the list structures of the normal cells) and the broadcast cell queue (the list structure of the broadcast cells) are formed in the shared buffer memory 21 in correspondence to the associated outgoing lines.

In the operation of reading out the cells from the shared buffer memory, a normal cell reading control unit 25 controls the reading of the cells from the normal cell queues to the outgoing lines OUT-1 to OUT-n, and a broadcast cell reading control unit 27 controls the reading of the cells from the broadcast cell queue to the associated outgoing lines which are specified by a broadcast destination table 28.

In the operation of reading out the normal cells, the normal cell reading control unit 25 accesses to the shared buffer memory 21 using the reading addresses corresponding to the associated outgoing lines, and supplies the cell which has been read out from the cell area 21A to DMX (demultiplexer) 23 and also stores a next address, which has been read out from the next address pointer area, as a reading address which will be used in the next cycle. Moreover, whenever the normal cell is read out from the shared buffer memory 21, the control unit 25 returns the reading address which is not required anymore to IABUF (idle address buffer) 29.

As described with reference to FIG. 6, in the cycle of reading out the broadcast cell, the broadcast cell reading control unit 27 reads out repeatedly the broadcast cell located at the head part of the broadcast cell queue in accordance with the destination bit pattern specified by the broadcast destination table, and returns the reading address which is not required anymore to IABUF 29 at the last of the broadcast cell reading cycle. In the present invention, the same cell is repeatedly read out from the broadcast queue by the necessary times, whereby the copies of that broadcast cell can be obtained.

The normal cell and the broadcast cell which have been read out from the shared buffer memory 21 in a time series manner are separated from each other by DMX 23 to be distributed to the associated outgoing lines.

The cells which have been distributed to the associated outgoing lines by DMX 23 are processed by an output interface 3 (3-1 to 3-n) which is provided every outgoing line. That is, the internal VPI of each cell is extracted by an output VPI conversion unit 32 (32-1 to 32-n), and an output VPI table 31 (31-1 to 31-n) is referred with the internal VPI thus extracted as a key.

The above-mentioned output VPI table 31 stores the correspondence relationship between the internal VPI and the outgoing VPI as the routing information of the output cell, and returns the outgoing VPI corresponding to the internal VPI, which was given from the output VPI conversion unit 32, to the output VPI conversion unit 32. After rewriting the internal VPI of the cell into the above-mentioned output VPI, the output VPI conversion unit 32 outputs the output cell to the associated outgoing lines.

The reason for employing the internal VIP as the internal routing information in the present embodiment is as follows.

In the ATM switch, the self-routing is performed on the basis of the routing information such as VCI and VPI given to each cell, and when the cell of which switching is completed is output to the associated outgoing lines, the rewrite of the routing information (the so-called header conversion) is performed for the subsequent communication unit. In this case, in the different incoming lines, the routing information having the same value is allowed to be used, and for the different outgoing lines, the rewrite to the routing information having the same value is allowed to be performed. Therefore, in order to properly carry out the self-routing, in addition to the routing information, the information for discriminating the incoming lines and the outgoing lines from each other becomes necessary.

However, since in the switching processing of the broadcast cell, the same cell is copied in the inside of the switch, such operation becomes essential that the header of the broadcast cell input from the switch is rewritten into the header having the output routing information corresponding to each outgoing line by each output interface. In this case, as compared with the method of obtaining the output routing information from the routing information and the information for discriminating the incoming lines and the outgoing lines from each other, the method of giving the special discrimination information such as the internal VPIs which are different depending on the kind of the broadcast cell is more advantageous in that the less amount of information to be held in the output VPI table 31 is required, and the circuit scale of the output interface can be decreased. Likewise, if the method of utilizing the internal VPI is employed, the amount of information to be held in the broadcast destination table 28 can also be decreased.

Incidentally, such a method may also be available that both the routing information and VPI are previously given to each broadcast cell, and on the basis of this information, the rewrite of the routing information of the broadcast cell is performed by the output interface. Moreover, the rewrite of the routing information of the input cell into the internal VPI is required for only the broadcast cell. Therefore, with respect to the normal cell, such a processing may be available that the internal VPI is omitted, and the routing information is directly converted into the output routing information by each input interface 1. The reason for taking such a processing is that with respect to the normal cell, the output destination of the cell can be uniquely determined by the input interface.

Figure 8:
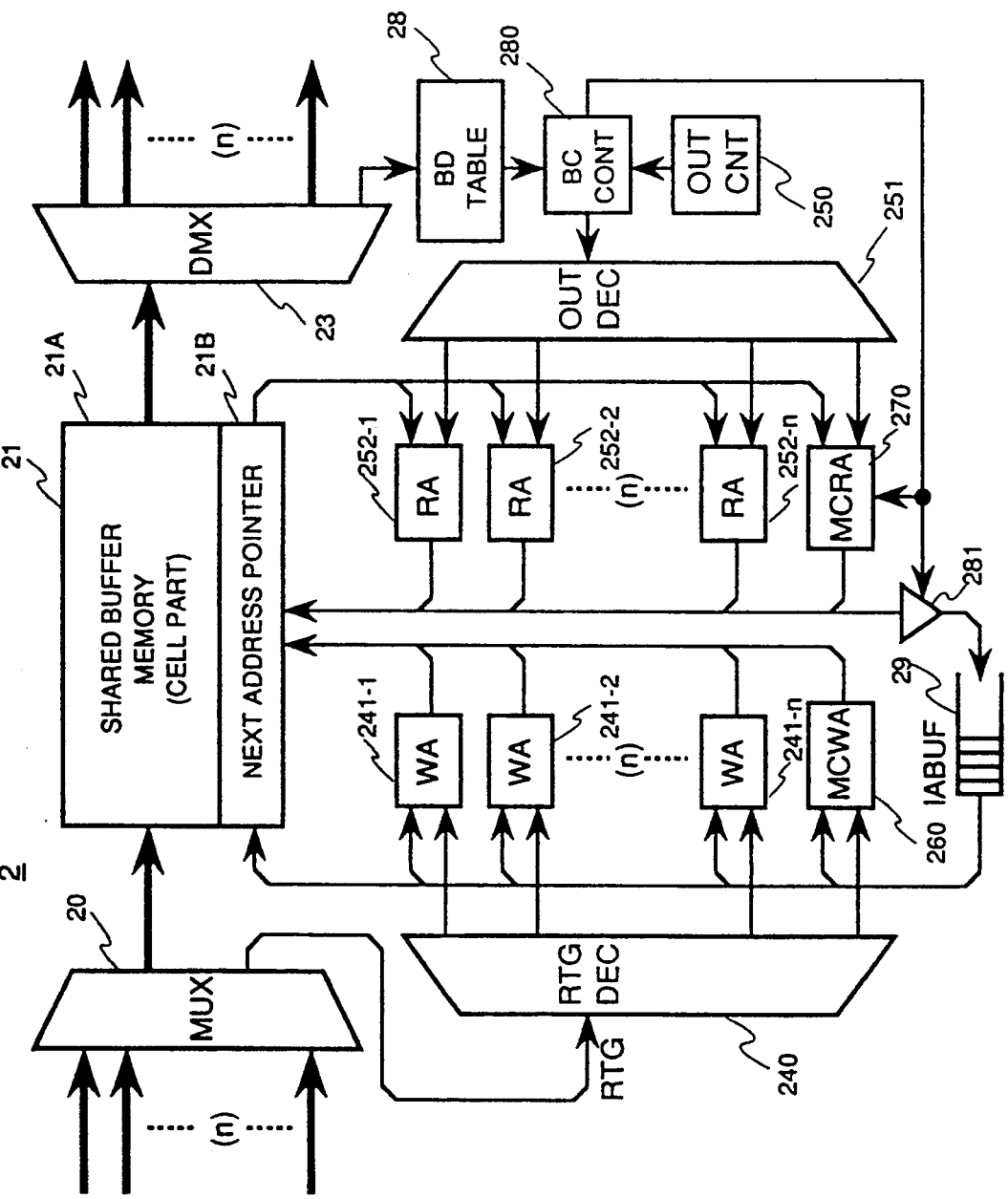
FIG. 8 is a block diagram showing the detailed structure of a circuit part relating to the writing control and the reading control of the cell in the ATM switch shown in FIG. 7.

FIG. 8 is a block diagram showing the detailed structure of the switch 2 shown in FIG. 7.

In the figure, the reference numeral 241 (241-1 to 241-n) designates WA (address register) constituting the normal cell writing control unit 24, the reference numeral 260 designates MCWA (address register) constituting the broadcast writing control unit 26, the reference numeral 250 (252-1 to 252-n) designates RA (address register) constituting the normal cell reading control unit 25, and the reference numeral 270 designates MCRA (address register) constituting the broadcast cell reading control unit 27.

The reference numeral 240 designates a routing decoder for decoding RTG (routing information) given from MUX 20, selecting WA 241-i corresponding to the outgoing line through which the cell is to be output, and judging whether the input cell is the broadcast cell or the normal cell on the basis of the cell kind discriminating information included in a part of RTG. When the input cell is the broadcast cell, MCWA 260 is necessarily selected.

MCWA 260 serves to manage the list structure forming the broadcast cell chain and performs the same operation as that of WA 241.

The operation of reading out the broadcast cell is as follows.

First, the shared buffer memory 21 is accessed using the head cell address of the broadcast cell list structure stored in MCRA 270. Then, in the same manner as that of the normal cell, the common cell is read out from the cell storage unit 21B, and the internal routing information included in the cell header part is fetched by DMX 23 to be given to the broadcast destination table 28.

The broadcast destination table 28 stores the broadcast destination specifying information (bit pattern) in correspondence to the internal routing information and outputs the internal routing information given by DMX, e.g., the broadcast destination specifying information corresponding to the internal VPI. This broadcast destination specifying information is sent to the broadcast control unit 280.

The broadcast control unit 280 generates a control signal for representing which should be output to the outgoing line OUT-i, the normal cell or the broadcast cell, on the basis of the broadcast destination specifying information, and the port number which has been output from OUT CNT (outgoing line counter) 250 and specifies the outgoing line OUT-i through which the cell is, to be subsequently output. The control signal is then sent to OUT DEC (outgoing line decoder) 251.

OUT DEC 251 selects RA 252-i corresponding to the outgoing line OUT-i when that control signal represents the output of the normal cell, and selects MCRA 270 when that control signal represents the output of the broadcast cell.

MCRA 270 stores the address of the broadcast cell located at the head part of the list structure of the broadcast cell, and gives, when selected by OUT DEC 251, that address as the reading address to the shared buffer memory 21. As a result, the broadcast cell is read out from the shared buffer memory 21 to be output to the outgoing line OUT-i through DMX 2. Whenever selected by OUT DEC 251, MCRA 270 can output the same reading address. As a result, the operation of producing the copies of the broadcast cell is performed in such a way that the same broadcast cell which has been repeatedly read out from the buffer memory 21 is supplied to a plurality of outgoing lines specified by the broadcast destination specifying information.

After the completion of the output of the broadcast cell to all the associated outgoing lines specified by the broadcast destination specifying information, at a predetermined time point, the address which has been stored in MCRA 270 is released to be returned to IABUF 29. As a result, one second area of the shared buffer memory 21 which has been occupied by the above-mentioned broadcast cell is released.

Prior to the release of the address described above, a new address which has been read out, together with the above-mentioned broadcast cell, from the next address pointer area 21B is given, as an address for reading out the next cell of the list structure, to MCRA 270. When the series of transmission processings about one broadcast cell has been .completed, the broadcast control unit 280 commands MCRA 270 to release the reading address of the broadcast cell and to update the reading address. The released address is returned to IABUF 29 by enabling a gate 281.

According to the above-mentioned structure, since one broadcast cell which is stored in the shared buffer memory 21 is repeatedly read out, thereby to produce a plurality of copies, the buffer capacity occupied by the broadcast cell has no connection with the number of broadcast destinations.

Figure 9:
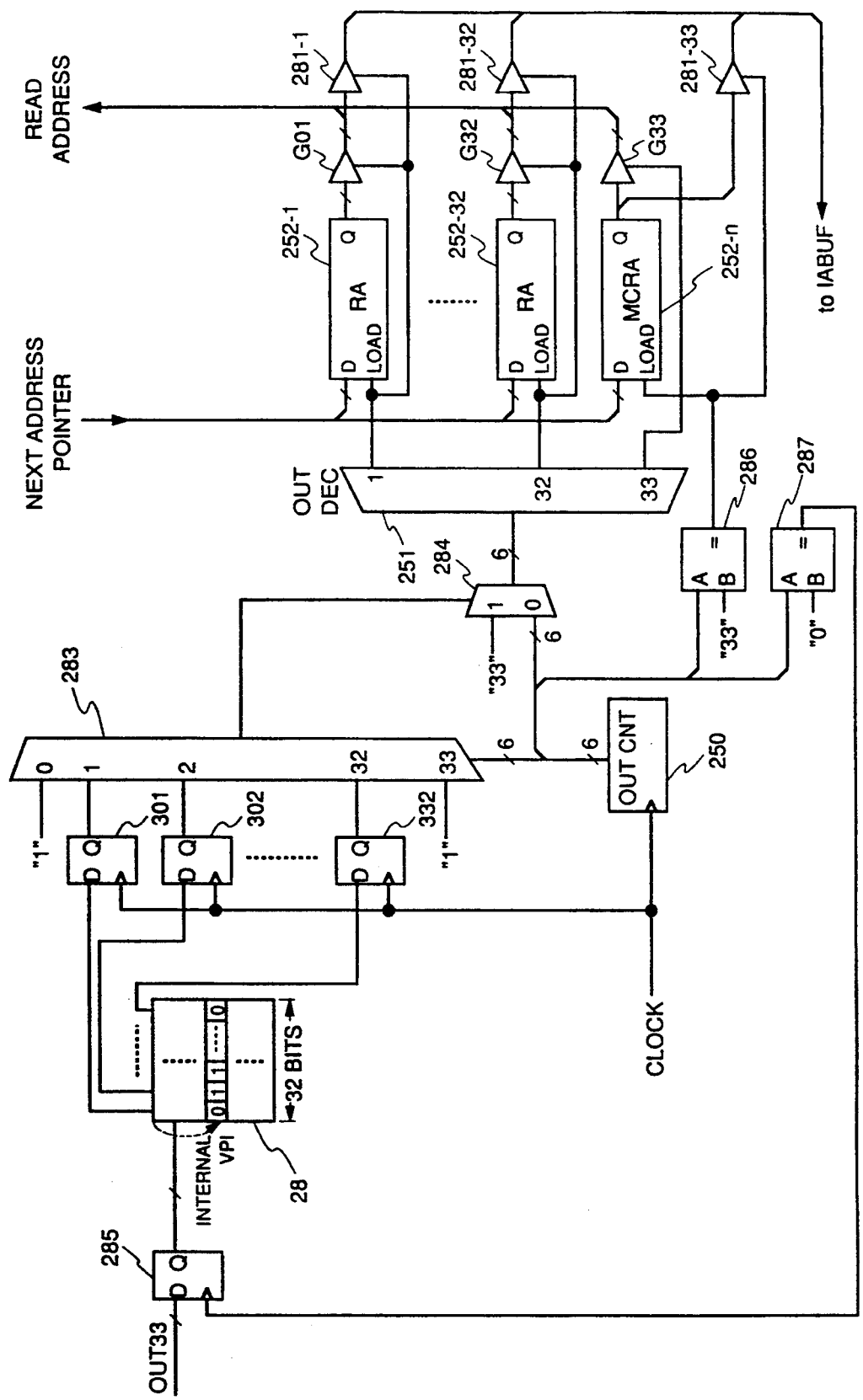
FIG. 9 is a block diagram showing a structure of an embodiment of a broadcast control circuit shown in FIG. 8.

FIG. 9 is a block diagram showing the detailed structure of the broadcast control unit 280. In this case, let us take the switch in which the number of output ports (outgoing lines) is "32" by way of example.

OUT 33 is a signal line for transmitting the internal VPI, which has been output from DMX 23 shown in FIG. 8, therethrough. That internal VPI is supplied to BD TABLE (broadcast destination specifying table) 28 through a latch circuit 285, and then the broadcast destination specifying bit pattern of 32 bits corresponding thereto is read out. That bit pattern is stored in latch circuits 301 to 332 which are provided in correspondence to the bits, and the outputs of those latch circuits are input to the 1-st to 32-th input terminals of a selector 283. In this connection, the fixed value "1" is input to the 0-th and 33-th input terminals of the selector 283.

An outgoing line counter 250 serves to count CLOCK (cell clock) cyclically with the maximum value as "33". The above-mentioned selector 283 selects the 0-th to 33-th inputs in turn in correspondence to the count value of the counter 250, and gives the selected input signal as a control signal to a selector 284. The selector 284 selects the fixed value "33" to give it to a decoder 251 when the control signal is "1" and selects the count value output from the outgoing line counter 250 to give it to the decoder 251 when the control signal is "0".

According to the above-mentioned structure, when the count value of the outgoing line counter 250 is either "0" or "33" the input value of the decoder 251 is necessarily "33", and when the count value of the outgoing line counter 250 is in the range of "1" to "32" the fixed value "33" becomes an input of the decoder 251 if the corresponding bit of the broadcast destination specifying information is "1" and the count value of the counter becomes the input of the decoder 251 if the corresponding bit of the broadcast destination specifying information is "0".

By enabling gates G01 to G33 corresponding to the input value selected by the selector 284, the decoder 251 activates one of normal cell address registers 252-1 to 252-32 when the input value is in the range of "1" to "32" and activates the address register 270 of the broadcast cell when the input value is "33". As a result, the operation of reading out the cell as described with reference to FIG. 6 is carried out.

When reading out the normal cell, the gate Gi (i=01 to 32) is enabled and at the same time a gate 281-i (i=1 to 32) is enabled, so that the released address is returned to the idle address buffer 29.

At a time point when the count value of the outgoing line counter 250 becomes "33", a comparator 286 enables the gate 281-33 and releases the address of the address register 270 for the broadcast cell. At this time, a next address which has been read out from the address pointer area 21B of the shared buffer memory is loaded into the address register 270 for the broadcast cell so that the update of the address is performed.

The first operation of reading out the broadcast cell using the updated next address is performed when the counter value of the counter 250 is "0". When the counter value of the outgoing line counter becomes "0", a comparator 287 enables the latch circuit 285, and inputs the internal VPI included in the header part of a new broadcast cell to the table 28.

Figure 10:
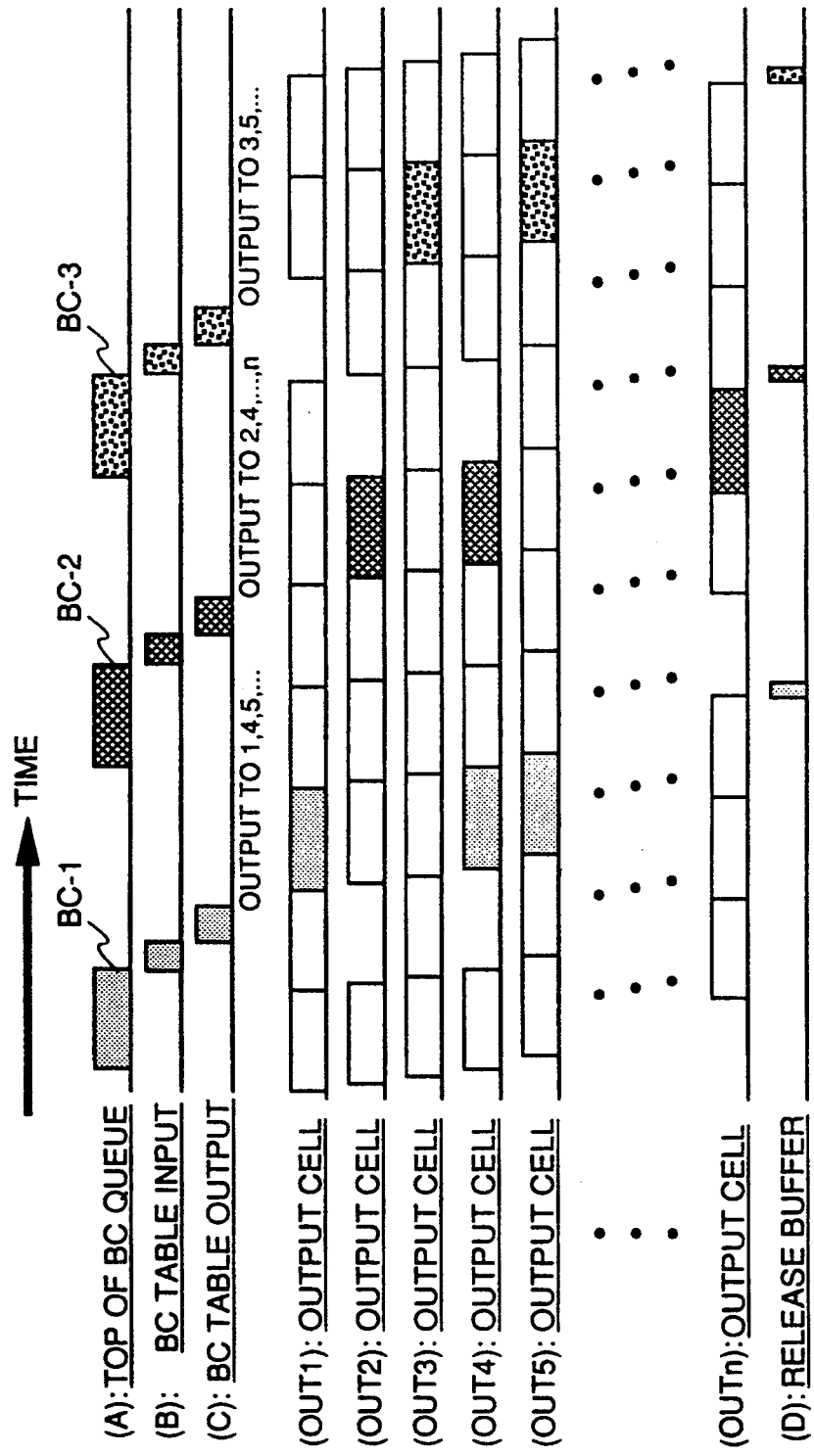
FIG. 10 is a timing chart useful in explaining the relationship between an output of a broadcast cell and an output of a normal cell in the ATM switch according to the present invention.

FIG. 10 shows one example of time charts of the normal cells and the broadcast cells in the ATM switch according to the present invention. In the figure, the void block represents the normal cell, and the block designated by the reference symbol BC represents the broadcast cell.

A time chart (A) shows the timing when the broadcast cells BC-1 to BC-3 arrive at the head of the broadcast cell queue (list structure). A time chart (B) shows the timing when the broadcast cell is read out from the head part of the broadcast cell queue in order to refer to the broadcast destination table 28. A time chart (C) shows the timing when the broadcast destination specifying information is transmitted from the broadcast destination table 28 to the broadcast control unit 280. A time chart (D) shows the timing when the address is returned to the idle address buffer. Time charts OUT1 to OUTn show flows of the cells which are output from the switch to the associated outgoing lines.

In the above-mentioned embodiment, the operation of reading out the internal routing information from the header part of the broadcast cell is performed utilizing DMX 23. However, the present invention is not limited thereto or thereby. That is, a part of the header output from the shared buffer memory 21B may be directly read to BD TABLE 28 or BC CONT 280.

Moreover, in the above-mentioned embodiment, only one pair of MCWA 260 and MCRA 270 for managing the list action of the broadcast cell are prepared. However, by preparing plural pairs of MCWAs and MCRAs, the plural list structures (queues) of the broadcast cells may be formed. In this case, such a processing may be performed that the information for representing the priority of the broadcast cell is previously added to a part of the internal routing information of the broadcast cell, and the broadcast control unit 280 controls a plurality of broadcast cell queues in accordance with the priorities of the broadcasts.

Figure 11:
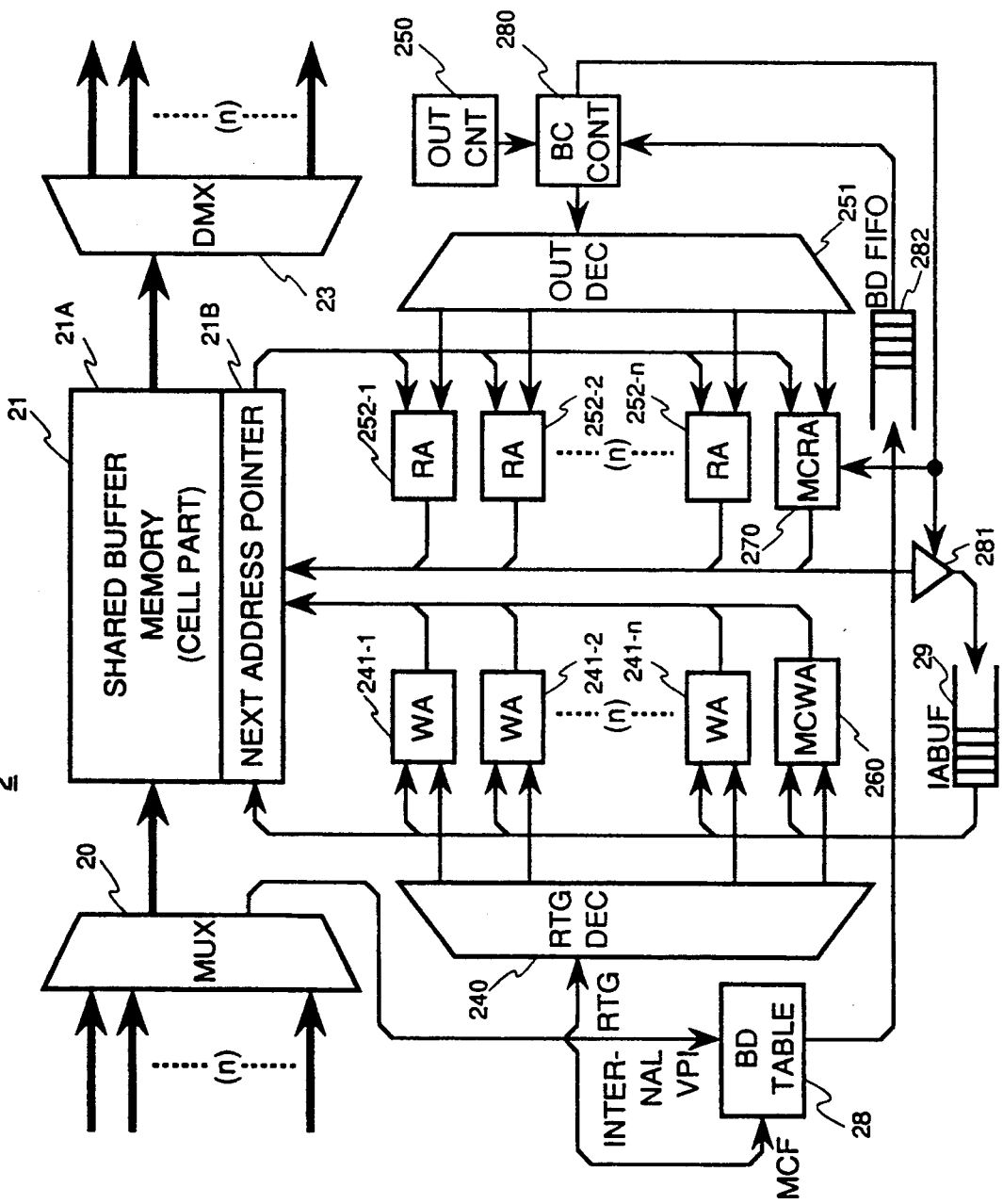
FIG. 11 is a block diagram showing a structure of a second embodiment of the ATM switch having a broadcast facility according to the present invention.

FIG. 11 is a block diagram showing a structure of a second embodiment of the ATM switch having a broadcast facility according to the present invention. The same circuit elements as those of FIG. 8 are designated by the same reference numerals. A point of difference of the second embodiment from the first embodiment is that the broadcast destination specifying table 28 is connected to MUX 20 located on the input side of the switch, and the internal VPI and MCF out of the header information, which each input cell supplied from MUX 20 to the shared buffer memory 21 has, are supplied from MUX 20 to the broadcast destination specifying table 28.

When the cell is input from MUX 20 to the shared buffer memory 21, the routing information RTG of that cell is given to RTG DEC (routing decoder) 240. In this connection, when that input cell is the normal cell, one of the writing address registers 241-1 to 241-n is operated. On the other hand, when that input cell is the broadcast cell, the address register 260 is operated. As a result, that input cell is coupled to one of the cell queues (list structures).

In the present embodiment, when the input cell is the broadcast cell, on the basis of the internal VPI extracted from the header part, the broadcast destination specifying table 28 is referred to obtain the information (bit pattern) for specifying the outgoing lines through which the copies of the broadcast cell are to be output, and this broadcast destination specifying information is stored in a BD FIFO memory (broadcast destination first-in first-out memory) 282.

To judge whether or not the input cell is the broadcast cell is performed by MCF (multicast flag). When MCF is "1" the broadcast destination specifying table 28 is enabled to output the broadcast destination specifying information corresponding to the internal VPI.

The operation of reading out the cell from the normal cell queue formed in the shared buffer memory 21 is performed in the same manner as that in the above-mentioned first embodiment. On the other hand, the operation of reading out the cell from the broadcast cell queue is performed in such a way that the broadcast control unit 250 reads out the broadcast destination specifying information from the FIFO memory 282 and then determines the outgoing lines through which the copies of the broadcast cell are to be output. After the broadcast cell has been output to all the associated outgoing lines specified by the broadcast destination specifying information, the broadcast control unit 250 enables the gate 281 to release the address of the shared buffer memory 21 stored in MCRA 270, and at the same time sets an address for accessing to the next broadcast cell in MCRA 270.

According to the present embodiment, when inputting the broadcast cell, the broadcast destination specifying table 28 is referred, and the broadcast destination specifying information, which will be necessary when reading out the broadcast cell, is previously stored in the FIFO memory 282. Therefore, a relative low-speed memory is applicable to the broadcast destination specifying table 28.

Figure 12:
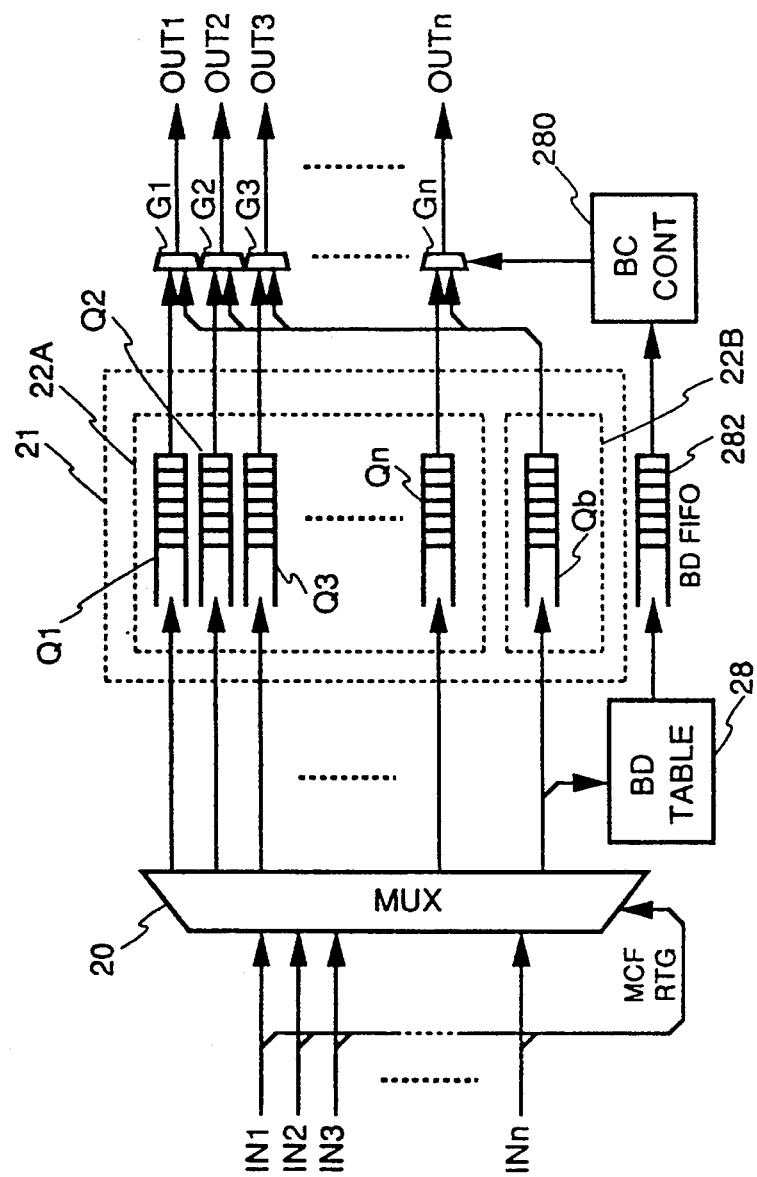
FIG. 12 is a block diagram useful in explaining the principle of operation of the ATM switch shown in FIG. 11.

FIG. 12 is a schematic block diagram useful in explaining the function of the ATM switch of the above-mentioned second embodiment according to the present invention. In the figure, the elements corresponding to those of FIG. 6 are designated by the same reference numerals.

It is readily understood from this figure that the destination specifying information is registrated in the FIFO memory 282 while registrating the broadcast cell to the broadcast cell queue Qb, and on the basis of the broadcast destination specifying information fetched from the FIFO memory 282, the output of the broadcast cell to the associated outgoing lines is controlled.

As apparent from the above description, according to the broadcast system of the present invention, since the broadcast cells are stored in the in the form of the list structure in the shared buffer memory in the same manner as that of the normal cells, the burst resistance which the shared buffer memory has essentially can also be utilized for the broadcast cell. Moreover, since the production of the copies of the broadcast cell is realized by reading out the same cell repeatedly to the different associated outgoing lines, the memory capacity which is occupied in the inside of the switch by the broadcast cells, or the traffic volume can be minimized.

Further, according to the broadcast system of the present invention, in particular, in the case where the routing information which is uniquely determined in the inside of the switch is used, the number of entries in the broadcast destination specifying table can be decreased, and thus the table capacity can be reduced.

The above-mentioned broadcast cell control of the present invention is, in addition to the switching system as described in the embodiments, applicable to other constituent systems of the ATM network such as a multiplexer.

What is claimed is:

1. A communication system having a plurality of incoming lines for receiving input cells of asynchronous transfer modes (ATM) including normal cells and broadcast cells and a plurality of outgoing lines for outputting said input cells input from the incoming lines, said system outputs said input cells to the outgoing lines in accordance with header information of said input cells, and outputs each of said normal cells to one of said plurality of outgoing lines and each of said broadcast cells to at least two of said plurality of outgoing lines, said system comprising:

input interface means provided for each of said incoming lines, for adding internal routing information, which is uniquely set in the inside of said communication system, to a header part of each of said input cells;

buffer memory means for storing temporarily said input cells;

writing control means for storing said input cells in said buffer memory means so as to form a plurality of list structures corresponding to the respective internal routing information, said list structures including one broadcast cell list structure for chaining said broadcast cells together, each of said broadcast cells in said one broadcast cell list structure has a pointer which indicates a cell to be output next, and a plurality of normal cell list structures for chaining said normal cells other than said broadcast cells together, said normal cell list structures corresponding to said outgoing lines;

reading control means for reading out said normal and broadcast cells from said plurality of list structures formed in said buffer memory means to distribute said normal and broadcast cells thus read to said outgoing lines; and output interface means provided for each of said outgoing line, for converting the header part of a cell read out from said buffer memory means by said reading control means into a header format which is used in a network connected to said outgoing lines of said communication system, said reading control means comprises:

table means for storing a bit pattern for specifying the outgoing lines, through which broadcast cell of interest is to be output, in correspondence to the internal routing information of the broadcast cell, and broadcast control means for reading out broadcast destination specifying information corresponding to the internal routing information of the broadcast cell located at a head part of said one broadcast cell list structure, selecting, on the basis of said broadcast destination specifying bit pattern thus read out, one of said plurality of list structures every outgoing line, and reading out the normal cell or the broadcast cell located at a head part of said list structure thus selected, said broadcast control means serving to read out the same broadcast cell repeatedly from said one broadcast cell list structure to the associated outgoing lines for a period of time until a next broadcast destination specifying bit pattern is read out from said table means.

2. A system according to claim 1, wherein said broadcast control means comprises:

plural address register means provided in correspondence to said plurality of list structures, for generating cell reading addresses; and means for selecting, on the basis of said broadcast destination specifying bit pattern, one of said plural address register means provided for each of said outgoing lines, and supplying the address generated by said selected address register means as a reading address to said buffer memory means.

3. A system according to claim 2, wherein said broadcast control means further comprises:

means for setting the address of the next normal cell to the contents of the address register means corresponding to said plurality of normal cell list structures at a time point when one normal cell located at a head part of each normal cell list structure is read out, and setting the address of the next broadcast cell to the contents of the address register means corresponding to said broadcast cell list structure in a predetermined timing after the same broadcast cell located at a head part of said one broadcast cell list structure is repeatedly read out.

4. A system according to claim 1, wherein each of said input interface means adds said internal routing information only when an input cell is a broadcast cell.

5. A system according to claim 1, wherein each of said input interface means adds information for judging whether an input cell is a broadcast cell or a normal cell based on a part of said internal routing information.

6. A communication system having a plurality of incoming lines for receiving input cells of asynchronous transfer mode (ATM) including normal cells and broadcast cells and a plurality of outgoing lines for outputting said input cells input from the incoming lines, said system outputs said input cells to the outgoing lines in accordance with header information of said input cells, and outputs each of said normal cells to one of said plurality of outgoing lines and each of said broadcast cells to at least two of said plurality of outgoing lines, said system comprising:

writing control means for storing said input cells in a buffer to form a plurality of list structures corresponding to the respective internal routing information included in a header part of each of said input cells, said list structures including one broadcast cell list structure for chaining said broadcast cells together, each of said broadcast cells in said one broadcast list structure has a pointer which indicates a cell to be output next, and a plurality of normal cell list structures for chaining said normal cells other than said broadcast cells together, said normal cell list structures corresponding to said outgoing lines; and reading control means for reading out said normal and broadcast cells from said plurality of list structures formed in said buffer to distribute said normal and broadcast cells thus read to said outgoing lines;

said reading control means comprises:

table means for storing a bit pattern for specifying the outgoing lines, through which a broadcast cell of interest is to be output, in correspondence to the internal routing information of the broadcast cell, and broadcast control means for reading out broadcast destination specifying information corresponding to the internal routing information of the broadcast cell located at a head part of said one broadcast cell list structure, selecting, based on said broadcast destination specifying bit pattern thus read out, one of said plurality of list structures every outgoing line, and reading out the normal cell or the broadcast cell located at a head part of said list structure thus selected, said broadcast control means serving to read out the same broadcast cell repeatedly from said one broadcast cell list structure to the associated outgoing lines for a period of time until a next broadcast destination specifying bit pattern is read out from said table means.

7. A system according to claim 6, wherein said broadcast control means comprises:

plural address register means provided in correspondence to said plurality of list structures, for generating cell reading addresses; and means for selecting, based on said broadcast destination specifying bit pattern, one of said plural address register means provided for each of said outgoing lines, and supplying the address generated by said selected address register means as a reading address to said buffer.

8. A system according to claim 7, wherein said broadcast control means further comprises:

means for setting the address of the next normal cell to the contents of the address register means corresponding to said plurality of normal cell list structures at a time point when one normal cell located at a head part of each normal cell list structure is read out, and setting the address of the next broadcast cell to the contents of the address register means corresponding to said broadcast cell list structure in a predetermined timing after the same broadcast cell located at a head part of said one broadcast cell list structure is repeatedly read out.

9. A system according to claim 7, wherein each of said input interface means adds said internal routing information only when the input cell is a cast cell.

10. A system according to claim 6, further comprising:

input interface means provided for each of said incoming lines, for adding said internal routing information, which is uniquely set in said communication system, to a header part of each of said input cells.

11. A system according to claim 10, wherein each of said input interface means adds information for judging whether an input cell is a broadcast cell or a normal cell based on a part of said internal routing information.

12. A system according to claim 6, further comprising:

output interface means provided for each of said outgoing lines, for converting the header part of a cell read out from said buffer by said reading control means into a header format which is used in a network connected to said outgoing lines.

13. A method in a communication system having a plurality of incoming lines for receiving input cells of asynchronous transfer modes (ATM) including normal cells and broadcast cells and a plurality of outgoing lines for outputting said input cells input from the incoming lines, said system outputs said input cells to the outgoing lines in accordance with header information of said input cells, and outputs each of said normal cells to one of said plurality of outgoing lines and each of said broadcast cells to at least two of said plurality of outgoing lines, said method comprising the steps of:

storing said input cells in a buffer to form a plurality of list structures corresponding to the respective internal routing information included in a header part of each of said input cells, said list structures including one broadcast cell list structure for chaining said broadcast cells together, each of said broadcast cells in said one broadcast list structure has a pointer which indicates cells to be output next, and a plurality of normal cell list structures for chaining said normal cells other than said broadcast cells together, said normal cell list structures corresponding to said outgoing lines; and reading out said normal and broadcast cells from said plurality of list structures formed in said buffer to distribute said normal and broadcast cells thus read to said outgoing lines;

said reading step comprises the steps of:

storing a bit pattern for specifying the outgoing lines, through which a broadcast cell of interest is to be output, in correspondence to the internal routing information of the broadcast cell, reading out broadcast destination specifying information corresponding to the internal routing information of the broadcast cell located at a head part of said one broadcast cell list structure, selecting, based on said broadcast destination specifying bit pattern thus read out, one of said plurality of list structures every outgoing line, and reading out the normal cell or the broadcast cell located at a head part of said list structure thus selected, wherein said step of read out the normal cell or the broadcast cell located at a head part of said list structures is performed such that when a broadcast cell is read out the same broadcast cell is read out repeatedly from said one broadcast cell list structure to the associated outgoing lines for a period of time until a next broadcast destination specifying bit pattern is read out.

* * * * *